Jan. 21, 1969   P. G. LA HAYE   3,422,800
COMBINED GAS TURBINE AND WASTE HEAT BOILER CONTROL SYSTEM
Filed June 19, 1967   Sheet 1 of 2

INVENTOR:
PAUL G. LaHAYE,
BY W. C. Crutcher
HIS ATTORNEY.

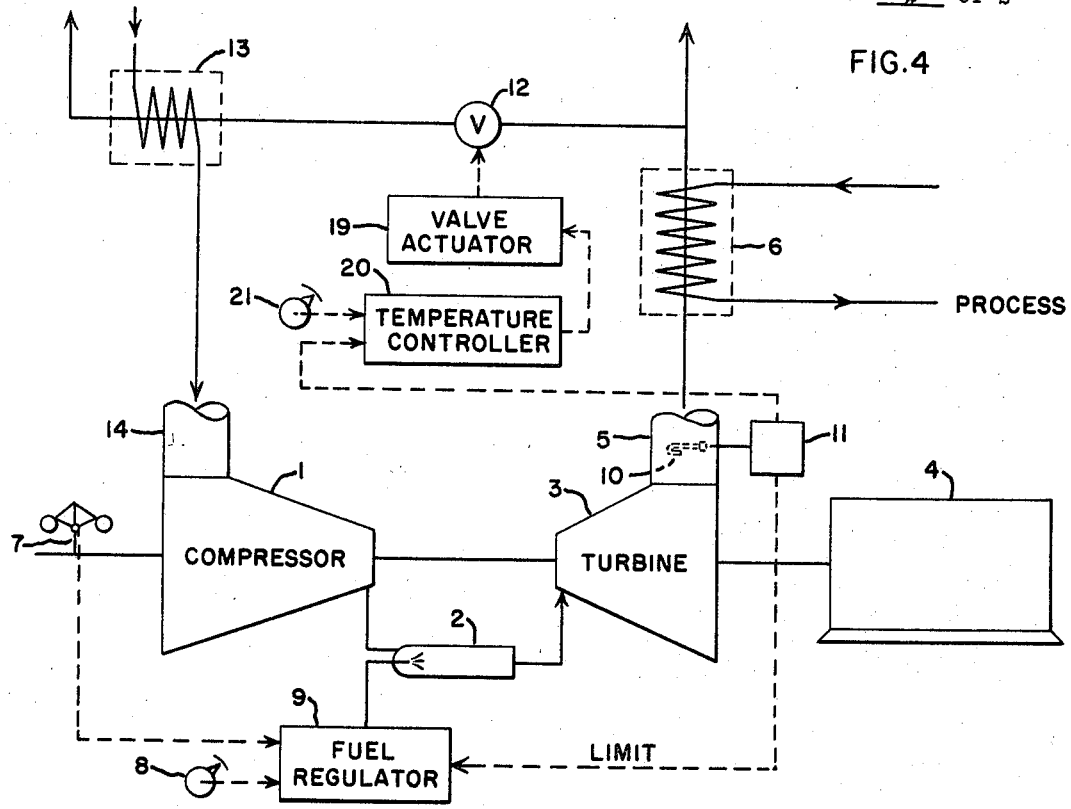
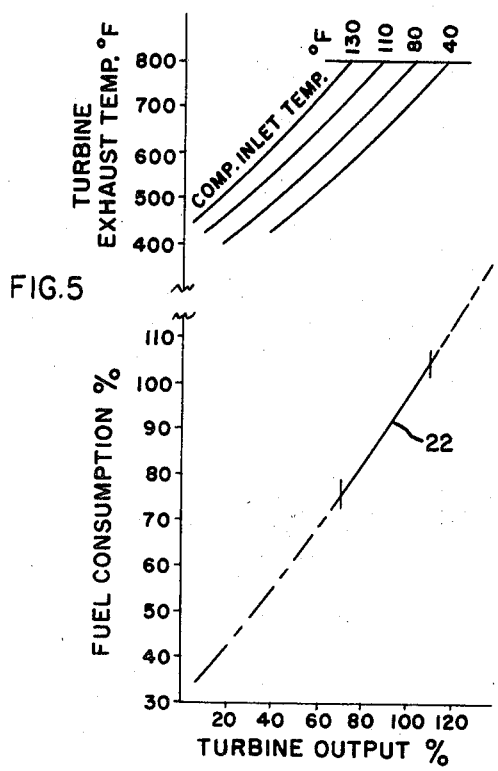
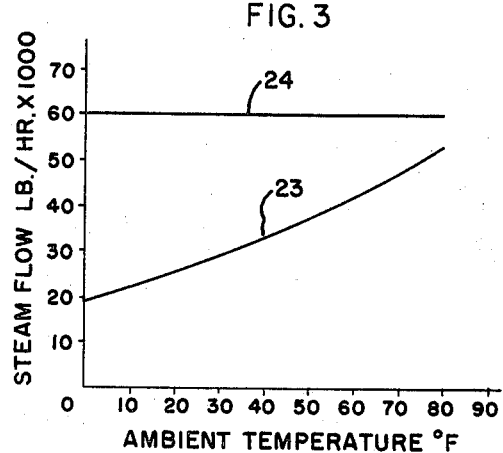
INVENTOR:
PAUL G. LaHAYE,
BY W. C. Crutcher
HIS ATTORNEY.

United States Patent Office 3,422,800
Patented Jan. 21, 1969

3,422,800
COMBINED GAS TURBINE AND WASTE HEAT BOILER CONTROL SYSTEM
Paul G. La Haye, Schenectady, N.Y., assignor to General Electric Company, a corporation of New York
Filed June 19, 1967, Ser. No. 647,015
U.S. Cl. 122—7                6 Claims
Int. Cl. F02g *5/00;* F22b *33/00;* F02g *3/00*

ABSTRACT OF THE DISCLOSURE

In a gas turbine powerplant with a waste heat boiler generating process steam, the air entering the gas turbine compressor is controllably heated with gas turbine exhaust gases so as to independently control steam generation despite varying ambient temperature or varying gas turbine load.

BACKGROUND OF THE INVENTION

This invention relates to an improved control system for a gas turbine powerplant having a waste heat boiler associated therewith. More particularly, the invention relates to an improved control system enabling independent control of the waste heat boiler in a gas turbine powerplant despite varying conditions which affect the gas turbine.

It has previously been suggested in a combined steam turbine and gas turbine cycle, wherein the gas turbine exhaust generates steam for a steam turbine mechanically coupled to gas turbine, that improved thermodynamic efficiencies can be obtained at reduced loads by heating the air entering the compressor. Such an arrangement is disclosed in U.S. Patent 3,150,487 issued to J. L. Mangan and T. G. Hiniker on Sept. 29, 1964, and assigned to the present assignee. In that arrangement, the load was shared by the gas turbine and the steam turbine. Compressor inlet air was heated in order to increase the part load efficiency of the coupled units.

It would be desirable to have a means for independently controlling or maintaining steam generation in powerplants where the waste heat boiler supplies process steam, for example. However, variations in the ambient air temperature or in the load on the gas turbine significantly affect the gas turbine exhaust temperature and hence the level of steam generation.

It has previously been suggested in U.S. Patent 2,554,228 issued to C. J. Walker and G. R. Fusner on May 22, 1951, that the flow rate of turbine exhaust gas through a waste heat boiler can be controlled independently of load on the turbine or ambient temperature by means of throttling the flow through the turbine. However, this arrangement would lead to substantially decreased cycle efficiencies.

Accordingly, one object of the present invention is to provide an improved control system for independently maintaining steam generating capabilities of a waste heat boiler heated by a gas turbine as the ambient temperature changes.

Another object of the invention is to provide an improved control system for a gas turbine and waste heat boiler which independently controls steam generating capabilities of the boiler despite variations in gas turbine load.

Figure 1:
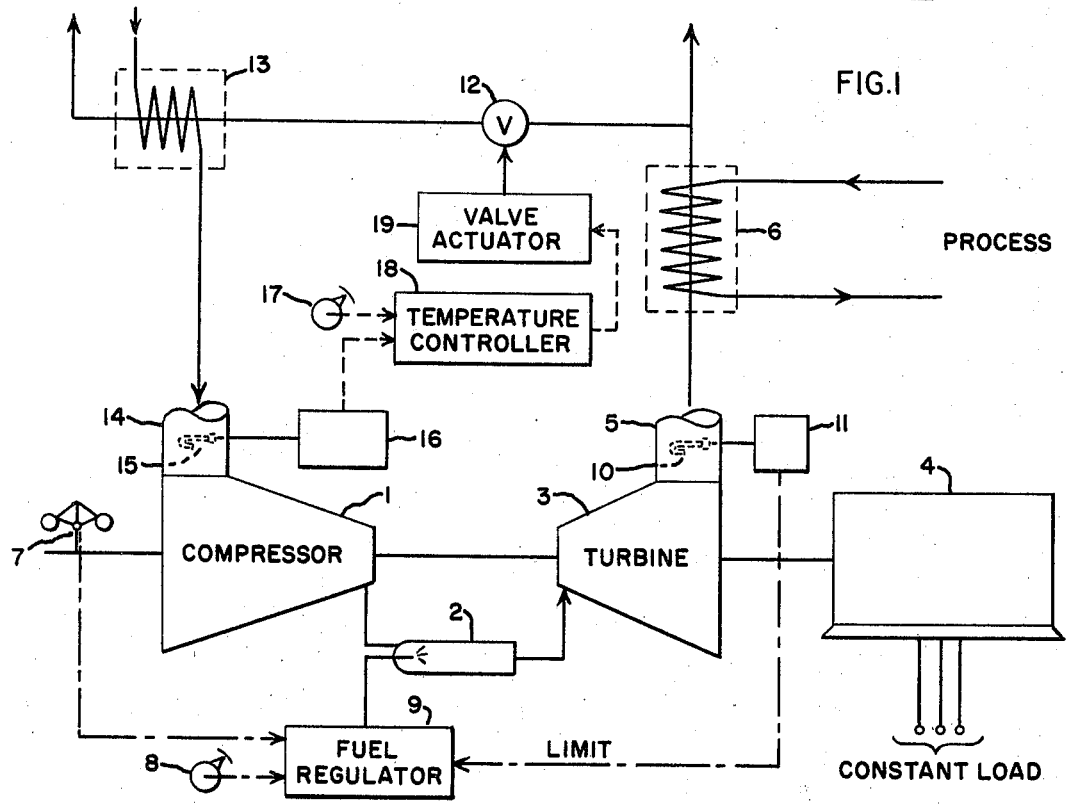
Figure 2:
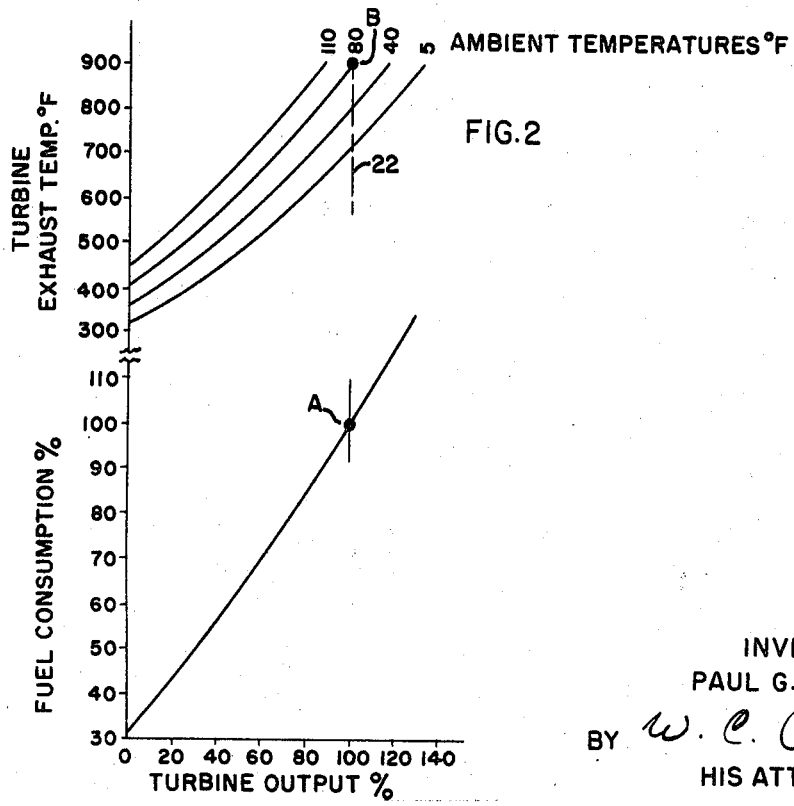

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a simplified schematic diagram of a control system for a gas turbine operating at constant load and having a process steam waste heat boiler, FIG. 2 is a graph of turbine output versus exhaust temperature and fuel consumption, FIG. 3 is a graph of ambient temperature versus rate of steam flow from the waste heat boiler, FIG. 4 is a simplified schematic diagram of a control system for a gas turbine operating at varying load and supplying process steam from a waste heat boiler, and FIG. 5 is a graph illustrating the operation of the FIG. 4 arrangement.

SUMMARY OF THE INVENTION

Briefly stated, the invention is practiced by utilizing the gas turbine exhaust to controllably heat the air entering the compressor, in order to hold the temperature of the gas turbine motive fluid at some point in the cycle substantially constant. The gas turbine itself is controlled as to speed or load by a primary control system with fast response using fuel flow. Heating of the compressor inlet air is accomplished with a secondary control system so as to independently control the steam generation.

DESCRIPTION

Referring now to FIG. 1 of the drawing, the gas turbine comprises a compressor 1, combustion chamber 2, and turbine 3, coupled to drive a load 4. Normally there are a number of combustion chambers, only one being shown for simplicity. In its simplest form, as shown in FIG. 1, the load 4 is substantially constant from the known characteristics of the external requirements. The turbine exhaust gas or motive fluid leaving through duct 5 passes through a waste heat boiler indicated schematically at 6. The details of the waste heat boiler are omitted, but it would generally include at least an economizer, steam generating coils with suitable saturated steam drum and recirculating pump, and superheater coils.

The primary control system for the gas turbine itself is conventional and comprises a speed sensing device 7 providing a signal which is compared with a reference speed (or load) signal selected by control knob 8. Errors in speed (or load) from the reference speed (or load) control fuel input from the fuel regulator 9 to the combustion chamber 2. Exhaust temperature is sensed by a temperature-responsive device 10 located in exhaust conduit 5. The turbine exhaust temperature is converted into a suitable control signal proportional to temperature by a transduced 11 to serve as a limitation on the fuel. An example of the foregoing fuel regulator with exhaust temperature limit may be seen by reference to U.S. Patent 2,528,252 issued to N. E. Starkey on Oct. 31, 1950. The regulator may include other refinements such as compressor discharge pressure biasing and rate-of-change of exhaust temperature limiting, which are not material to the present invention.

In accordance with one aspect of the invention, means are provided to controllably heat the air entering compressor 1. This is indicated as a bypass valve 12 diverting a portion of the turbine exhaust gases through a heat exchanger 13. Air at ambient temperature is heated to a selected temperature above ambient, in accordance with the position of bypass valve 12, before the air enters the compressor inlet conduit 14. A compressor inlet temperature responsive device 15, disposed in the inlet conduit 14, provides a signal proportional to compressor inlet temperature by means of transducer 16. This inlet temperature responsive signal is compared to a set point or reference temperature selected by knob 17 in a temperature controller 18. The error signal (or difference between reference and actual inlet temperature) is supplied to a valve actuator 19 which controls the opening or closing of valve 12, in a direction to reduce the error.

The temperature controller 18 may employ electrical, pneumatic, or mechanical signals and is preferably of the proportional-speed floating control type so as to provide an output which is the integral of the error signal. Such a simple control can be used since the process is inherently self-regulating. The valve actuator 19 may position valve 12 mechanically, hydraulically, electrically, or by any suitable method. The details of the inlet temperature controller and valve actuator are not shown since they will be apparent to those skilled in the art, but suitable control components for accomplishing the foregoing may be similar to those described in "Automatic Control-Principles and Practices," by Werner G. Holzbock, published by Reinhold Publishing Corp. (1958). When constant steam generation is required, the reference temperature set with knob 17 is preferably higher than the maximum which the ambient temperature is expected to reach during a reasonable period. Therefore, some inlet heating of ambient air in heat exchanger 13 will always be taking place in order to hold the compressor inlet temperature sensed by device 15 at a fixed value equal to the reference temperature.

Reference to FIG. 2 illustrates the effects of both load variation and ambient temperature variation in a conventional single shaft gas turbine. It will be observed that variations either in turbine load or ambient temperature will affect the turbine exhaust temperature, which in turn affects the steam generating capabilities of waste heat boiler 6. In the arrangement of FIG. 1, the load is assumed to be constant as indicated at point A on the lower portion of the graph. However, it will be observed that exhaust temperature will still vary with ambient temperature along the vertical line 22.

In accordance with the embodiment of FIG. 1 of the invention, the compressor inlet temperature is held constant at a selected value above ambient (for the conditions then current) as indicated at point B on the upper portion of the graph.

Speed of the gas turbine is held constant by the primary control system, which means that a constant volume flow of air is pumped by the compressor.

Since the load is constant and the compressor inlet temperature is held constant by the secondary control system, it will be apreciated that the steam generating capabilities of the waste heat boiler will be held fixed despite uncontrollable variations in ambient temperature below the selected reference or set point for the compressor inlet temperature.

Reference to FIG. 3 of the graph will illustrate the difference between steam generating capabilities of the waste heat boiler 6 before and after the invention. The lower curve 23 illustrates the prior art variation of steam flow with ambient temperature without using compressor inlet heating. Curve 24 which is obtained using the arrangement of FIG. 1, indicates that inlet heating provides essentialy constant steam flow for varying air ambient temperatures up to the selected reference temperature.

It will be appreciated that the turbine and compressor can be designed for best efficiency at any assumed compressor inlet temperature desired. Although gas turbines are usually designed to provide suitable matching of compressor and turbine at a rated inlet temperature and pressure (such as the NEMA conditions of 80° F. and 14.17 p.s.i.a.) variations from these rated conditions result in poor matching of compressor and turbine. With the present invention, the turbine and compressor can be designed to operate at higher compressor inlet temperature than usual, because of the fact that this temperature will be held constant and therefore the turbine and compressor will always be matched for the best efficiencies.

There will be some systems where the load on the gas turbine will not be constant. In such systems the turbine exhaust temperature will be affected by both load and ambient temperature. However the invention can be employed to hold the generating capabilities of the waste heat boiler at a selected value despite a reasonable load variation on the gas turbine by a modified form of the invention.

Reference to FIG. 4 illustrates a variation of the control arrangement, wherein the compressor inlet temperature is not held constant necessarily but is varied in order to hold the gas turbine exhaust temperature constant at a selected set point or reference temperature. The same reference numerals are used as for like elements in FIG. 1.

In FIG. 4, rather than sensing and holding compressor inlet temperature constant, valve 12 is actuated in a manner so as to hold the turbine exhaust temperature at a selected value. To accomplish this, a signal proportional to exhaust temperature is taken from transducer 11 and supplied as an input to a temperature controller 20, wherein it is compared with a set point or reference exhaust temperature set by knob 21. As before, the output from temperature controller 20 is amplified and used to set a corresponding position of valve 12 so as to reduce the error to zero.

Contrary to the simple proportional-speed or integrating controller 18 of FIG. 1, temperature controller 20 is preferably of the proportional plus reset type. This type of control causes valve 12 to assume a position which will cause sufficient heating of the compressor inlet air so that exhaust temperature sensed at 10 exactly matches the set point or reference temperature set with knob 21. Any number of commercially available control devices are suitable for providing the aforesaid proportional plus reset action, and these can be pneumatic, electronic, hydraulic or mechanical.

Although the exhaust temperature sensor 10 and transducer 11 are common to both the primary fuel control system and the secondary temperature control system, they do not perform the same function for both of the control systems, and two separate sensors and transducers could be used if desired. In the primary control, the exhaust temperature signal functions to limit the supply of fuel such that a maximum exhaust temperature is not exceeded and is primarily a protective measure for the turbine. In the secondary control system, however, the exhaust temperature signal functions as a feedback for sensing actual temperature to be compared to a reference temperature. It will be apparent, therefore, that the desired turbine exhaust temperature set on controller 20 will be overridden by the limiting temperature set on the fuel regulator. Calling for higher exhaust temperatures with temperature control at 20 will serve to no avail if the exhaust temperature limit has limited fuel flow, hence, heat release in the combustion chamber.

A primary use of the FIG. 4 arrangement is to provide a separate and independent means of controlling the waste heat boiler process, so as to hold steam generated in boiler 6 at a constant flow or pressure despite variations in ambient temperature or variation over a reasonable load range. In FIG. 4 it will be observed that variations in load 4 are handled by the primary control loop, wherein more or less fuel is burned to meet changing load requirements. This primary control loop has a rapid speed of response and serves to maintain stability of the system. However, in the secondary control loop, the otherwise normal tendency of turbine exhaust temperature to fluctuate with load is counteracted by the slower responding air inlet heating control which holds exhaust temperature constant.

The effect of all the foregoing is, of course, to provide independent control of the waste heat boiler inlet temperature or turbine exhaust temperature since, if exhaust temperature is maintained, the process steam generated will be essentially the same, despite a new load on the gas turbine. Minor variations will occur due to minor variations in the compressor inlet pressure. Changes in ambient temperature are compensated for in a similar manner.

Reference to FIG. 5 shows a graph similar to that of FIG. 2, but wherein load may vary over a considerable range indicated by solid line portion 22 of the turbine output curve. Assuming ambient air at 40°, turbine load can vary from about 70 to 120% of rated load with compressor inlet temperature being heated to assume values of between 40 and 130° F. to hold the exhaust temperature constant at around 800° F.

It will be appreciated that in the foregoing arrangements, the temperature control loop is secondary to the primary speed control loop. In other words, minor variations in speed or load are handled quickly by the conventional gas turbine control system with fast response. The slower acting temperature control serves to adjust for effects of ambient temperature and in some cases varying load. The invention is useful, therefore, to hold the steam generation capabilities constant or to vary them in accordance with a preselected or desired schedule, so that greater flexibility is afforded by the gas turbine powerplant and waste heat boiler combination.

In the simple embodiments of FIGS. 1 and 4, independent settings are provided for the primary and secondary controls. Therefore, some trimming may be required in load setting, for instance, when a change is made in the temperature setting. In other refinements, which will be apparent to those skilled in the art, automatic trimming controls could be provided so that a single setting would suffice without additional trimming being necessary. Another use of such trimming controls, where it is desired to hold the steam generation at a constant value, would be to compensate for the slight mass flow changes that take place when compressor inlet temperature is changed. These variations are understood by those skilled in the art and where it is said that the temperature of the gas turbine motive fluid is held at a selected value, it is understood that this value may be trimmed to compensate for such mass flow variations.

While there has been shown what is considered to be the preferred embodiment of the invention, it is of course understood that various other modifications may be made therein, and it is intended to cover in the appended claims all such modifications as fall within the true spirit and scope of the invention.

What I claim as new and desire to secure by Letters Patent of the United States is:

1. A control system for an open cycle combustion gas turbine powerplant, comprising:
    a gas turbine having a compressor, at least one combustion chamber supplied with fuel and a turbine, connected for flow of motive fluid therethrough,
    a load connected to be driven along with the compressor by said turbine,
    a waste heat boiler disposed to generate steam from the exhaust heat of said turbine,
    inlet air heating means disposed to receive heat from the exhaust of said turbine and arranged to heat ambient air entering the compressor,
    primary control means responsive to turbine speed and operable to vary the fuel flow to thereby control the gas turbine, and
    secondary control means operable to vary the effect of the inlet air heating means responsive to the temperature of the motive fluid and so as to control the temperature of the gas turbine motive fluid entering the waste heat boiler independently of the load on the gas turbine.

2. The combination according to claim 1 wherein said load on the gas turbine is substantially constant and wherein said secondary control means is responsive to compressor inlet temperature and is arranged to heat the compressor inlet air to a selectable temperature.

3. The combination according to claim 1, wherein said load on the gas turbine is variable and wherein said secondary control means is responsive to turbine exhaust temperature and is arranged to hold the turbine exhaust temperature at a selected temperature.

4. A control system for a gas turbine power plant with a waste heat boiler, comprising:
    a gas turbine having a compressor, a heat source and a turbine, connected for flow of motive fluid therethrough,
    a load connected to be driven along with the compressor by said turbine,
    a waste heat boiler disposed to receive heat from the exhaust of said turbine and arranged to generate vapor therein,
    inlet air heating means disposed to receive heat from the exhaust of said turbine and arranged to heat ambient air entering the compressor,
    primary control means responsive to turbine speed and operable to vary the heat released by the heat source to thereby control the gas turbine, and
    secondary control means responsive to the temperature of the motive fluid and operable to vary the effect of the inlet air heating means so as to control the generation of vapor in the waste heat boiler independently of the gas turbine speed.

5. The combination according to claim 4, wherein said load on the gas turbine is substantially constant and wherein said secondary control means is responsive to compressor inlet temperature and arranged to hold compressor inlet temperature at a selected fixed temperature above ambient temperature.

6. The combination according to claim 4, wherein said secondary control means is responsive to turbine exhaust temperature and is arranged to vary the air inlet heating means so as to hold the exhaust temperature at a selected substantially fixed value, whereby generation of vapor in the waste heat boiler will be substantially constant despite variations in load on the turbine.

References Cited

UNITED STATES PATENTS

| | | | |
|---|---|---|---|
| 2,554,228 | 5/1951 | Walker et al. | 60—39.07 |
| 2,633,707 | 4/1953 | Hermitte et al. | 60—39.18 |
| 2,642,721 | 6/1953 | Mallinson | 60—59 |
| 3,150,487 | 9/1964 | Mangan et al. | 60—39.18 |
| 3,252,286 | 5/1966 | Whitelaw | 60—59 |

JULIUS E. WEST, *Primary Examiner.*

U.S. Cl. X.R.

60—39.07, 39.28, 59, 39.18